United States Patent
Hsu (10) Patent No.: US 9,302,540 B2
(45) Date of Patent: Apr. 5, 2016

(54) WHEEL FRAME OF THE FIBER COMPOSITE MATERIAL

(71) Applicant: FULL TECH COMPOSITE MANUFACTURING COMPANY, Zhongshan, Guangdong Province (CN)

(72) Inventor: Joseph Hsu, Taichung (TW)

(73) Assignee: FULL TECH COMPOSITE MANUFACTURING COMPANY, Zhongshan, Guangdong Province (CN)

( * ) Notice: Subject to any disclaimer, the term of this patent is extended or adjusted under 35 U.S.C. 154(b) by 378 days.

(21) Appl. No.: 13/821,518

(22) PCT Filed: Oct. 23, 2012

(86) PCT No.: PCT/CN2012/083376
§ 371 (c)(1),
(2) Date: Mar. 7, 2013

(87) PCT Pub. No.: WO2014/063307
PCT Pub. Date: May 1, 2014

(65) Prior Publication Data
US 2014/0110993 A1    Apr. 24, 2014

(51) Int. Cl.
*B60B 25/02* (2006.01)
*B60B 5/02* (2006.01)
*B60B 21/00* (2006.01)

(52) U.S. Cl.
CPC . *B60B 25/02* (2013.01); *B60B 5/02* (2013.01); *B60B 21/00* (2013.01); *B60B 2360/36* (2013.01); *B60B 2360/368* (2013.01); *B60B 2900/111* (2013.01); *B60B 2900/311* (2013.01)

(58) Field of Classification Search
CPC ........ B60B 21/00; B60B 21/02; B60B 25/00; B60B 25/02
USPC ............. 301/95.101, 95.102, 95.103, 95.106, 301/95.11
See application file for complete search history.

(56) References Cited

U.S. PATENT DOCUMENTS 4,252,378 A * 2/1981 DeBolt et al. ............ 301/64.702
5,080,444 A * 1/1992 Hopkins et al. .......... 301/95.107
(Continued)

FOREIGN PATENT DOCUMENTS

| CN | 2589229 Y | 12/2003 |
| CN | 2763099 Y | 3/2006 |

(Continued)

*Primary Examiner* — Jason Bellinger
(74) *Attorney, Agent, or Firm* — Muncy, Geissler, Olds & Lowe, P.C.

(57) ABSTRACT

A wheel frame of the fiber composite material includes multiple arched frame bars each including a foam body made out of a foam material and a fiber composite cover layer made out of a fiber composite material and wrapped about the foam body, the arched frame bars being joined together by means of connection surface portions of the fiber composite cover layers thereof to form a circular wheel frame, the connection surface portions of each two adjacent arched frame bars forming a support face to work as a support rib supporting the wheel frame. Thus, the fiber composite wheel frame has the characteristic of lightweight and will not easily break.

5 Claims, 9 Drawing Sheets

(56) References Cited

U.S. PATENT DOCUMENTS

| | | | | |
|---|---|---|---|---|
| 5,249,846 | A | * | 10/1993 | Martin et al. ............ 301/95.102 |
| 6,273,518 | B1 | * | 8/2001 | Chen ......................... 301/95.101 |
| 6,283,557 | B1 | * | 9/2001 | Okajima et al. ......... 301/95.104 |
| 6,398,313 | B1 | * | 6/2002 | Lew ........................... 301/95.102 |
| 6,991,300 | B2 | * | 1/2006 | Colegrove ................ 301/95.103 |
| 7,503,860 | B2 | * | 3/2009 | Gazzara et al. ............... 473/535 |
| 7,578,563 | B2 | * | 8/2009 | Muraoka et al. ................ 301/58 |
| 2006/0197369 | A1 | * | 9/2006 | Chiu et al. ...................... 301/6.3 |
| 2008/0296961 | A1 | * | 12/2008 | Dal Pra' .................... 301/95.103 |
| 2011/0273001 | A1 | * | 11/2011 | Poertner et al. .......... 301/95.102 |

FOREIGN PATENT DOCUMENTS

| | | |
|---|---|---|
| CN | 201070961 Y | 6/2008 |
| CN | 201506211 U | 6/2010 |
| FR | 2702707 A1 | 9/1994 |
| JP | 8295101 A | 11/1996 |
| JP | 999703 A | 4/1997 |
| TW | 540474 | 7/2003 |
| TW | I329080 | 8/2010 |
| TW | 201228875 A | 7/2012 |

* cited by examiner

WHEEL FRAME OF THE FIBER COMPOSITE MATERIAL

BACKGROUND OF THE INVENTION

1. Field of the Invention

The present invention relates to a wheel frame for supporting a tire and more particularly, to a wheel frame of the fiber composite material.

2. Description of the Related Art

Taiwan Patent 1329080 discloses a hollow wheel frame for a bicycle. According to this design, the hollow wheel frame defines an outer tire groove for bonding or plug-setting a tire. The inner side of the hollow wheel frame is adapted for the mounting of spokes. By means of the spokes, the hollow wheel frame is connected to a wheel hub of a bicycle and rotatable with the wheel hub.

Conventional wheel frames for the bicycle are made of iron. An iron wheel frame has a strong structure and a heavy weight. In order to reduce the weight, aluminum is lately used to make wheel frames. Conventional methods have difficulties in making aluminum alloy wheel frames and cutter wheels or disc wheels over 50 mm height.

Nowadays, bicycle designs trend toward making the bicycle lightweight. Carbon fiber composite materials that are harder and lighter than aluminum are used not only for making bicycle frames but also for the fabrication of wheel frames, for example, the aforesaid prior art hollow wheel frame is made using carbon fiber composite materials.

However, wheel frames of carbon fiber composite materials are commonly made using blow molding technology. Due to hollow structure, a carbon fiber composite wheel frame will break easily if the wall thickness is too thin. However, when increasing the wall thickness, the weight of the carbon fiber composite wheel frame will be relatively increased. Further, a composite wheel frame made by means of blow molding is somewhat soft, it cannot completely and effectively transfer the force or torque applied by the rider to the tire, further it can break easily when twisted.

SUMMARY OF THE INVENTION

The present invention has been accomplished under the circumstances in view. It is the main object of the present invention to provide a wheel frame of the fiber composite material, which has the characteristic of lightweight and will not easily break.

To achieve this and other objects of the present invention, a wheel frame of the fiber composite material comprises a plurality of arched frame bars. Each arched frame bar comprises a foam body made out of a foam material, and a fiber composite cover layer made out of a fiber composite material and wrapped about the foam body. The arched frame bars are joined together by means of the fiber composite cover layers thereof to form a circular wheel frame. Thus, the fiber composite wheel frame has a thin fiber composite cover layer. Subject to the buffer effect of the foam body, the fiber composite wheel frame will not easily break and has the characteristic of lightweight. Further, although the fiber composite wheel frame is not a one piece member, the arched frame bars are positively joined together by means of their fiber composite cover layers, avoiding separation of different materials due to the heat.

Other advantages and features of the present invention will be fully understood by reference to the following specification in conjunction with the accompanying drawings, in which like reference signs denote like components of structure.

DETAILED DESCRIPTION OF THE INVENTION

The present invention is now described with reference to the drawings, wherein like reference numerals are used to refer to like elements throughout.

Figure 1:
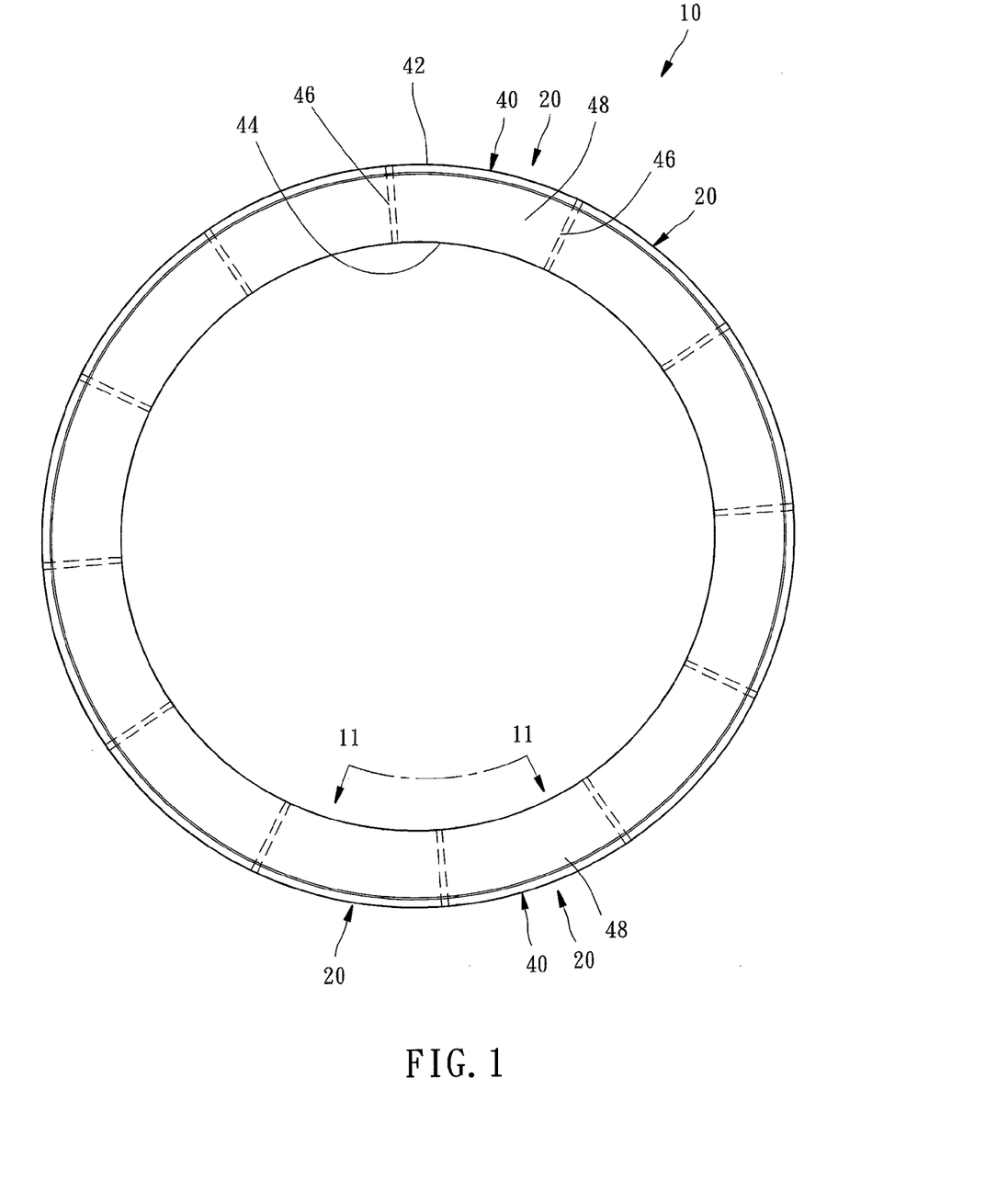
FIG. 1 is a schematic plain view of a wheel frame of the fiber composite material in accordance with a first embodiment of the present invention.
Figure 2:
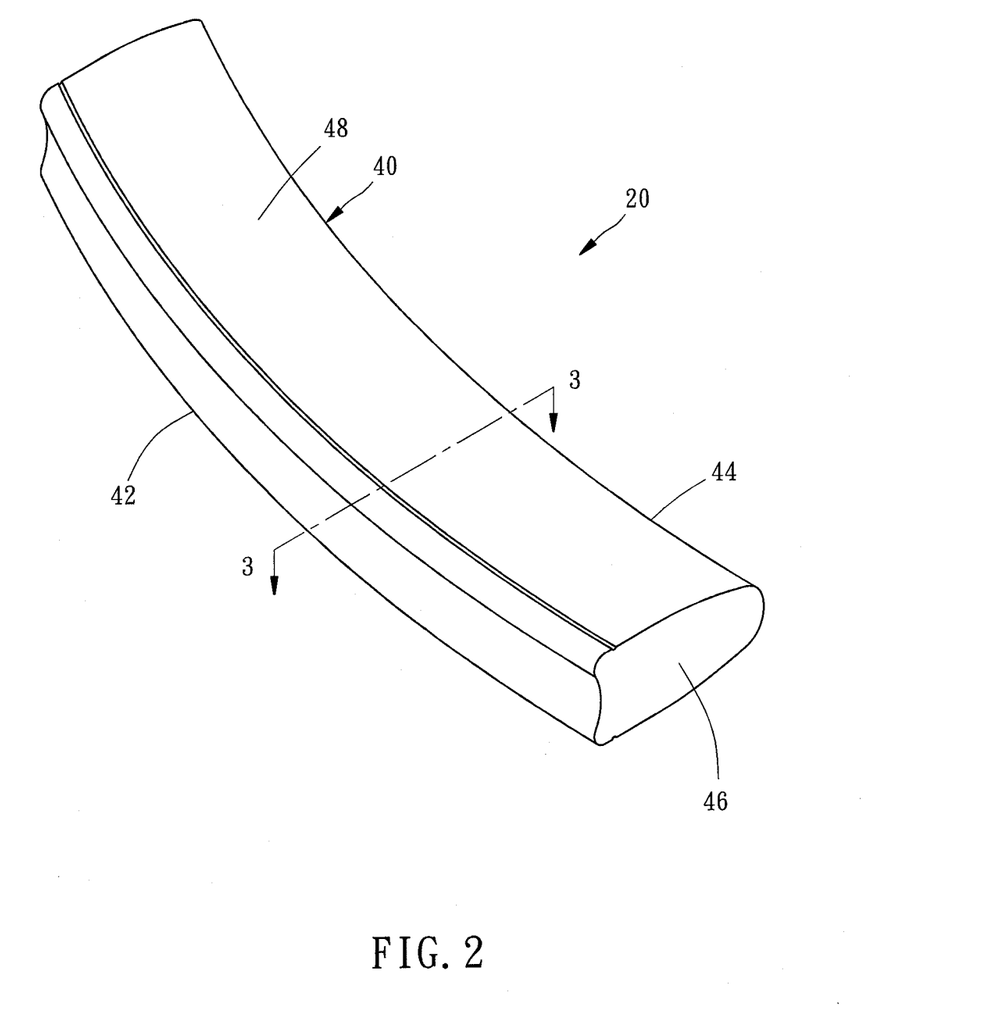
FIG. 2 is an elevational view of one arched frame bar of the fiber composite wheel frame in accordance with the first embodiment of the present invention.
Figure 3:
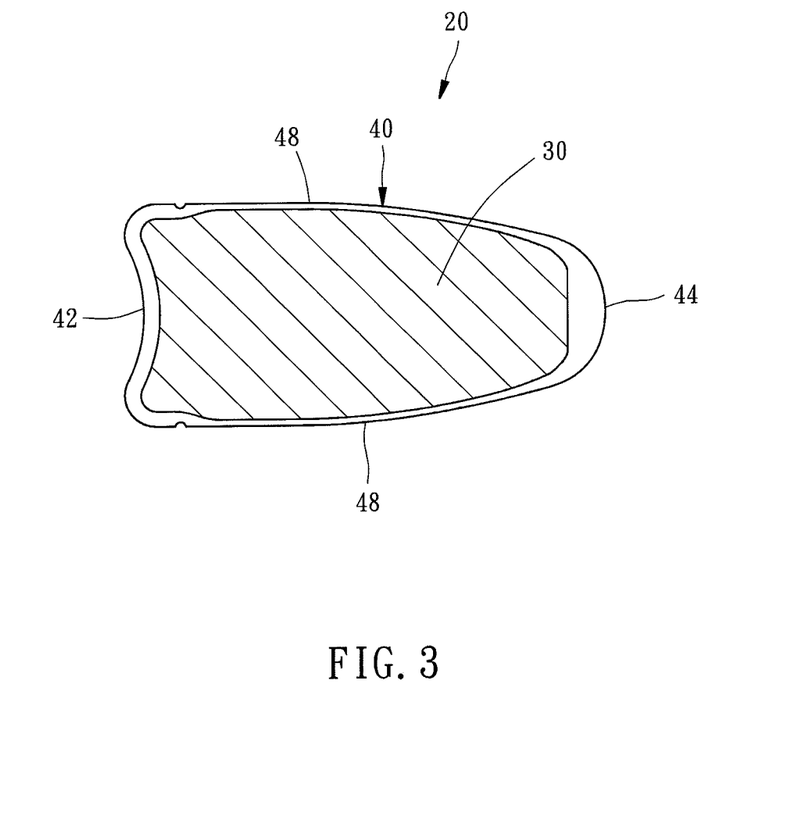
FIG. 3 is a sectional view taken along line 3-3 of FIG. 2.

Referring to FIG. 1, a fiber composite wheel frame 10 in accordance with the present invention is shown comprises 12 pieces of arched frame bars 20. As shown in FIGS. 2 and 3, each arched frame bar 20 comprises a foam body 30, and a fiber composite cover layer 40 surrounding the foam body 30.

The foam body 30 is made out of a foam material having the characteristics of high toughness and high collision resistance, such as polyurethane foam or polycarbonate foam.

The fiber composite cover layer 40 is made out of carbon fiber composite, glass fiber composite or polyester fiber composite, having the characteristics of high hardness, low specific gravity, high temperature and corrosion resistant properties. In this embodiment, the fiber composite cover layer 40 is made out of carbon fiber composite. The foam body 30 is made in a specific predetermined shape. After the fiber composite cover layer 40 is wrapped about the foam body 30, it defines a recessed outer lateral portion 42, a protruded inner lateral portion 44, and two opposite connection surface portions 46 and two opposite side face portions 48 respectively connected between the outer lateral portion 42 and the inner lateral portion 44. Each connection surface portion 46 is fixedly connected to one connection surface portion 46 of another arched frame bar 20. Thus, the connection surface portions 46 of the fiber composite cover layers 40 of the arched frame bars 20 connected together, forming the circular wheel frame 10. When the respective connection surface portions 46 of two adjacent arched frame bars 20 are joined together, they form a support face that joins the associating outer lateral portions 42, inner lateral portion 44 of side face portions 48 of the two adjacent arched frame bars 20, providing support to the wheel frame like an I-beam.

Figure 4:
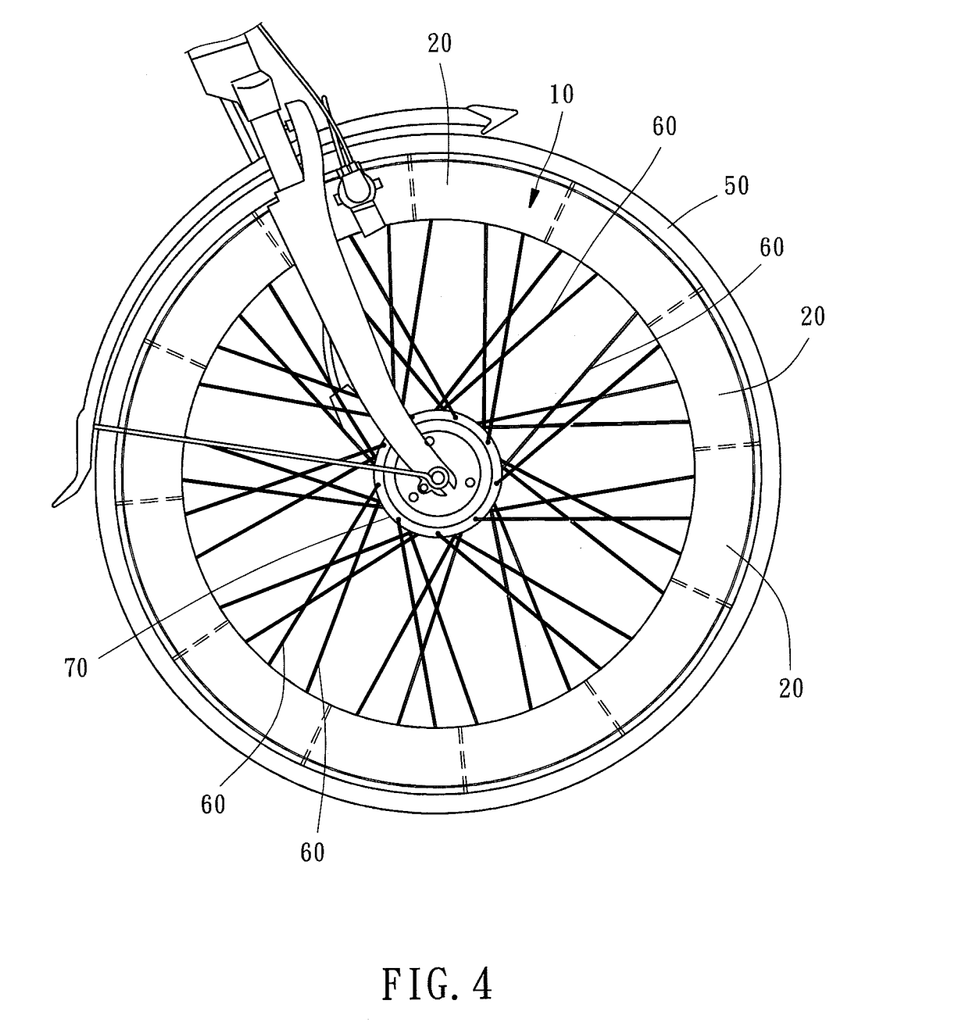
FIG. 4 is a schematic applied view of the first embodiment of the present invention, illustrating the fiber composite wheel frame used in a bicycle.

Referring to FIG. 4, the wheel frame 10 enables a tire 50 to be mounted at the outer lateral portions 42 of the fiber composite cover layers 40 of the arched frame bars 20, and connected to a wheel hub 70 of a bicycle by spokes 60 for rotation with the wheel hub 70 by a bicycle rider. At this time, the inner lateral portions 44 of the fiber composite cover layers 40 of the arched frame bars 20 are kept facing toward the wheel hub 70.

It is worth mentioning that the wheel frame 10 is made by connecting a plurality of same arched frame bars 20 into a circular shape wherein each arched frame bar 20 comprises a shock absorbing foam body 30 and a fiber composite cover layer 40 surrounding the shock absorbing foam body 30. Thus, the wheel frame 10 is not only lightweight, but its foam body-based solid structure enables the fiber composite cover layer 40 to be made having a thin thickness and not easily breakable. Further, there is no limitation on the number of the arched frame bars 20 of the fiber composite wheel frame 10, i.e., the number of the arched frame bars 20 can be 3, 5, 8, 10, and etc., where the arched frame bars 20 can be connected into a circular shape.

Figure 5:
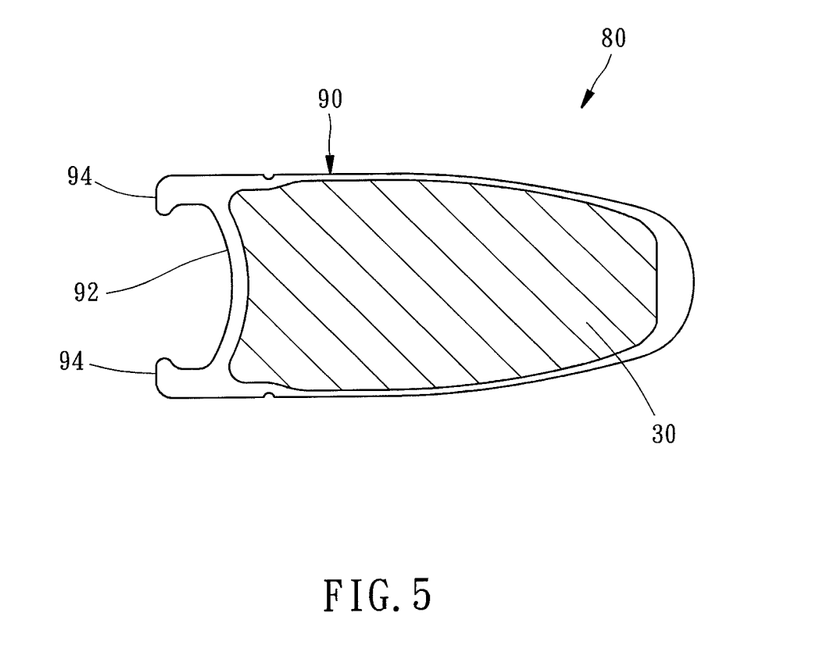
FIG. 5 is a sectional view of an arched frame bar for fiber composite wheel frame in accordance with a second embodiment of the present invention.
Figure 6:
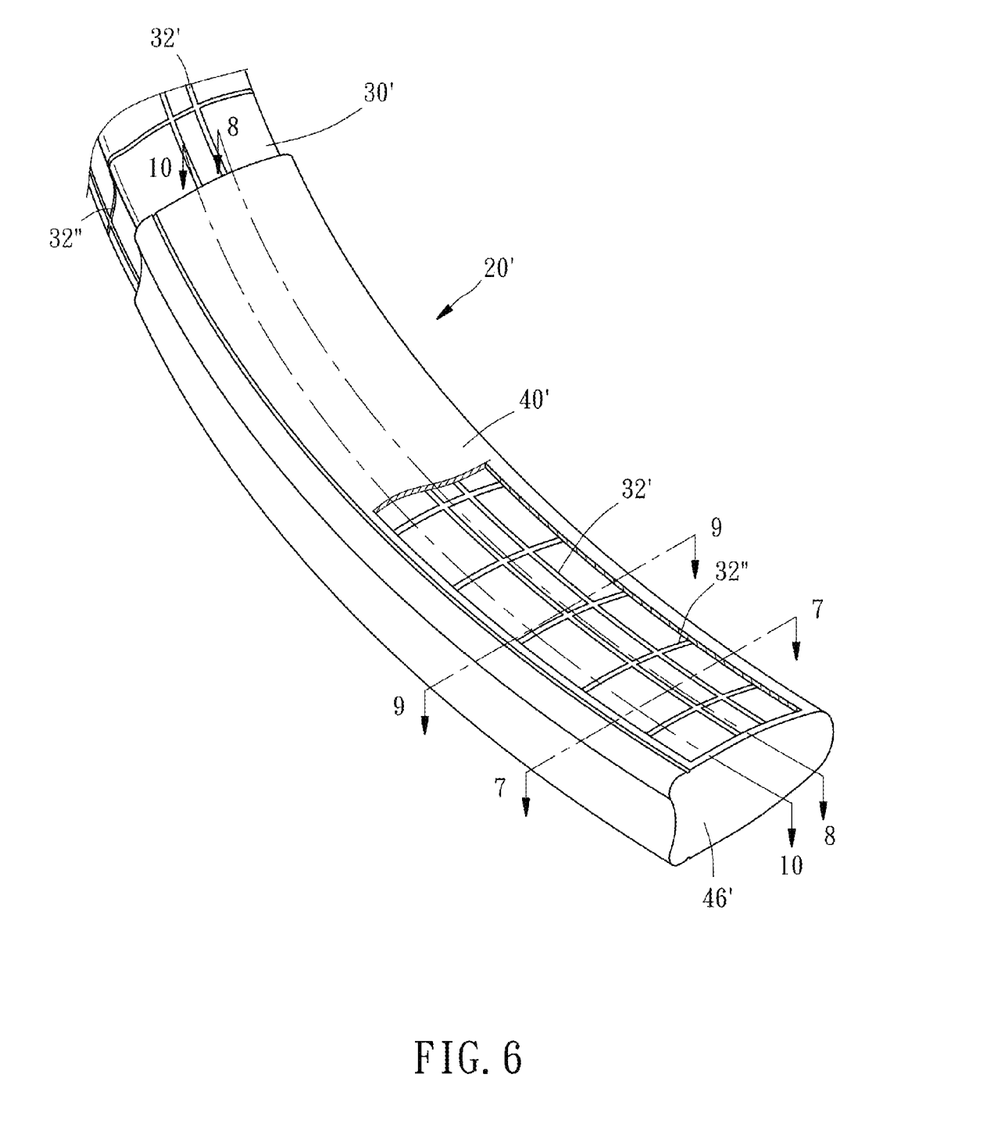
FIG. 6 is a cutaway view of one arched frame bar for fiber composite wheel frame in accordance with a third embodiment of the present invention.
Figure 7:
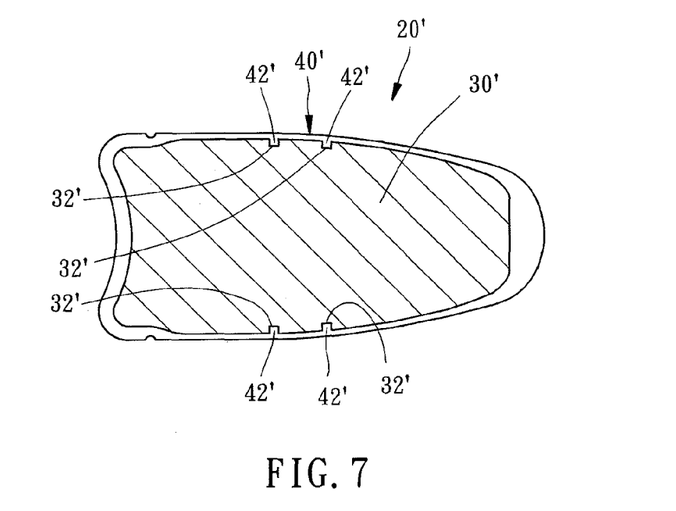
FIG. 7 is a sectional view taken along line 7-7 of FIG. 6.

In the aforesaid embodiment, the tire 50 is affixed to the outer lateral portions 42 of the fiber composite cover layers 40 of the arched frame bars 20 by bonding. FIG. 5 illustrates an alternate form of the fiber composite wheel frame. The main feature of this second embodiment is that the fiber composite cover layer 90 of each arched frame bar 80 in accordance with this second embodiment further comprises two hook portions 94 bilaterally extended from the outer lateral portion 92 thereof for positive engagement with the tire to enhance connection stability between the tire and the wheel frame.

Figure 8:
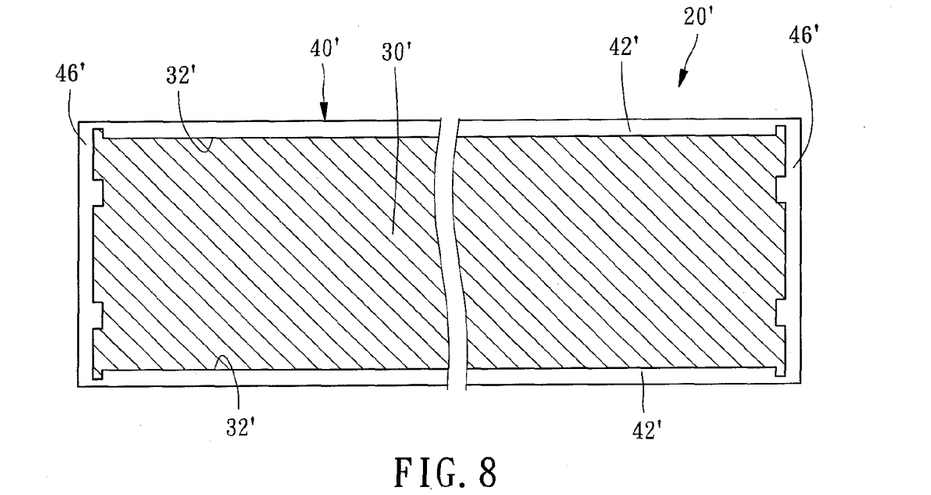
FIG. 8 is a sectional view taken along line 8-8 of FIG. 6.
Figure 9:
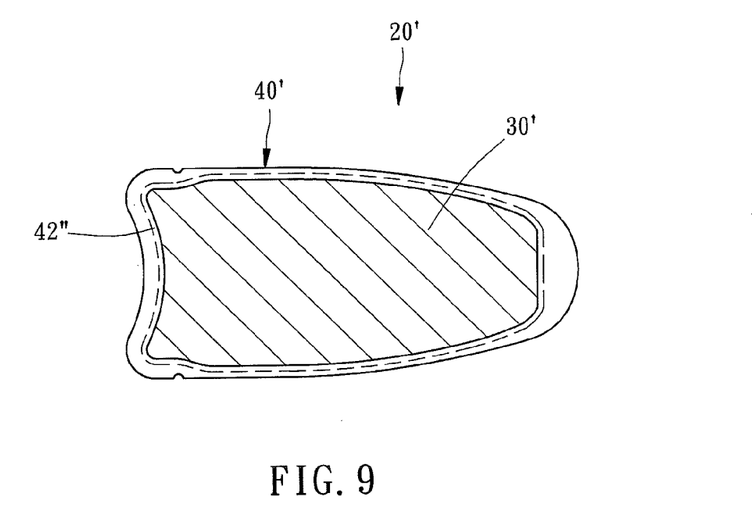
FIG. 9 is a sectional view taken along line 9-9 of FIG. 6.
Figure 10:
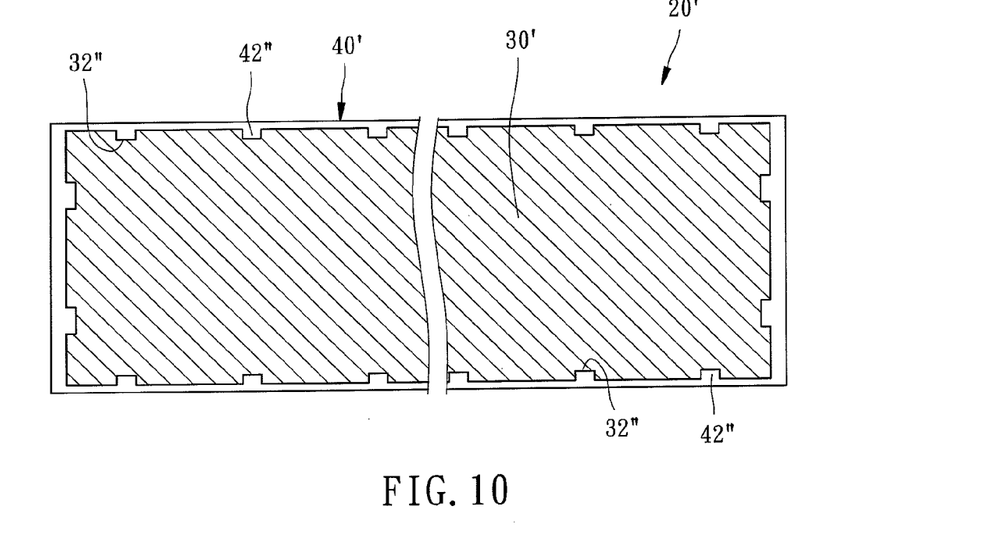
FIG. 10 is a sectional view taken along line 10-10 of FIG. 6.
Figure 11:
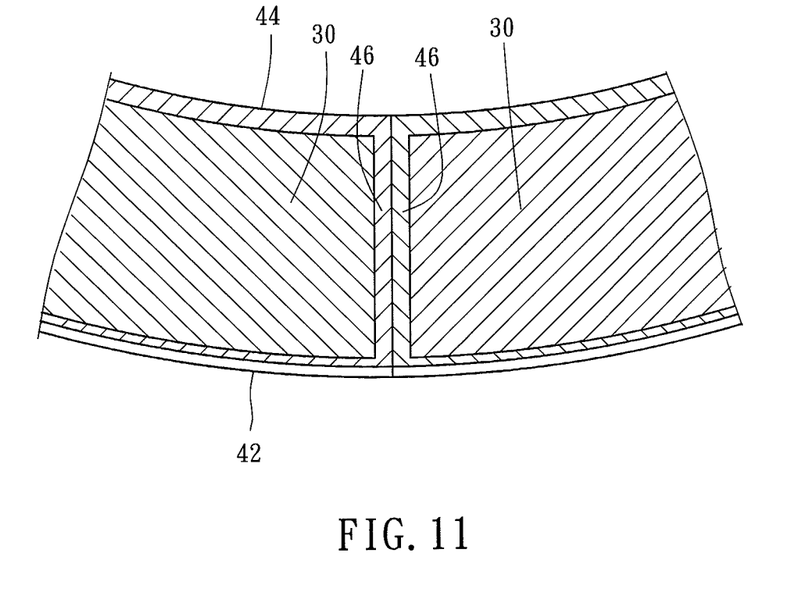
FIG. 11 is a sectional view taken along line 11-11 of FIG. 1.

FIGS. 6-10 illustrate a fiber composite wheel frame in accordance with a third embodiment of the present invention. This third embodiment is characterized in that the foam body 30' of each arched frame bar 20' in accordance with this third embodiment further comprises two grooves 32', therefore when the fiber composite cover layer 40' of each arched frame bar 20' is partially engaged into the grooves 32' to form respective reinforcing ribs 42' when it is wrapped about the associating foam body 30'. The formation of the reinforcing ribs 42' enhances the structural strength of the wheel frame and the connection between the fiber composite cover layer 40' and the foam body 30'. In this third embodiment, the grooves 32' and the reinforcing ribs 42' extend along the major axis of the respective arched frame bars 20', i.e., extending from the location adjacent to one connection surface portion 46' of the fiber composite cover layer 40' to the other connection surface portion 46'. Further, the grooves 32' can extend to the connection surface portions 46', as shown in FIG. 8, to enhance the structural strength when two connection surface portions are joined together. However, it is to be understood that the number and configuration of the grooves 32' and reinforcing ribs 42' of the arched frame bars 20' can be variously embodied. The transverse extending direction of the reinforcing ribs is not a limitation. For example, in FIGS. 6, 9 and 10, the grooves 32" of the foam body 30' and the reinforcing ribs 42" of the composite cover layer 40' extend around the foam body 30'.

The main features of the present invention are the use of a foam-based core material and the arrangement of grooves on the foam-based core material to form reinforcing ribs. These features are not attainable by a fiber composite wheel frame made by means of blow molding. When mounting the tire, the steel wires of the spokes impart a pull force to secure the wheel frame and the wheel hub together. At this time, each spoke defines with the wheel frame a contained angle. This contained angle causes the wheel frame to generate a lateral internal stress. At this time, a tensile strength higher than a hollow wheel frame is produced between the reinforcing ribs of the foam material, minimizing the lateral internal stress of the wheel frame, enhancing and maintaining the tension of the spokes.

When braking, the wheel frame will rub against the brake pad to generate heat. At this time, a conventional hollow carbon fiber wheel frame will deform due to lack of support. However, the invention prevents this wheel frame deformation problem because of the support of the foam material.

Further, the wheel frame based on the rib-reinforced foam material in accordance with the present invention can disperse and absorb stress and vibrations, making the rider more comfortable.

Further, the wheel frame based on the rib-reinforced foam material in accordance with the present invention provides higher rigidity and torque than conventional hollow carbon fiber wheel frames, enabling pedaling force to be fully transmitted to greatly improve pedaling efficiency.

Although particular embodiments of the invention has been described in detail for purposes of illustration, various modifications and enhancements may be made without departing from the spirit and scope of the invention. Accordingly, the invention is not to be limited except as by the appended claims.

What is claimed is:

1. A wheel frame of a fiber composite material, comprising:
   a plurality of arched frame bars, each of said arched frame bars comprising a foam body made of a foam material and a fiber composite cover layer made of the fiber composite material and wrapped about said foam body, said arched frame bars being joined together by the fiber composite cover layers thereof to form a circular wheel frame, connection surface portions of each two adjacent said arched frame bars forming a support face to work as a support rib supporting the wheel frame,
   wherein said foam body of each of said arched frame bars comprises at least one groove formed on the foam body; and the fiber composite cover layer of each of said arched frame bars is partially engaged into the at least one groove of the respective arched frame bar,
   wherein said fiber composite cover layer of each of said arched frame bar comprises an outer lateral portion for supporting a tire, an inner lateral portion disposed opposite to said outer lateral portion, and two of the connection surface portions opposing each other and two opposing side face portions respectively connected between said outer lateral portion and said inner lateral portion, each connection surface portion of one of said arched frame bars being connected to one connection surface portion of another one of said arched frame bars, and
   wherein each of said connection surface portions of each of said arched frame bars comprises the at least one groove.

2. The wheel frame of the fiber composite material as claimed in claim 1, wherein said at least one groove of said foam body of each of said arched frame bars extends along a major axis of said arched frame bar and around said foam body.

3. The wheel frame of the fiber composite material as claimed in claim 1, wherein said groove of said foam body of each of said arched frame bars extends along a minor axis of said arched frame bar and around said foam body.

4. The wheel frame of the fiber composite material as claimed in claim 1, wherein said fiber composite cover layer of each of said arched frame bars further comprises two hook portions extended from the outer lateral portion thereof.

5. The wheel frame of the fiber composite material as claimed in claim 1, wherein said fiber composite material is a carbon fiber composite material.

* * * * *